United States Patent [19]

Krusas et al.

[11] Patent Number: 4,711,539
[45] Date of Patent: Dec. 8, 1987

[54] SUPPORT STRUCTURE FOR PROTECTIVE MASK OPTICAL INSERT

[75] Inventors: James J. Krusas, Sturbridge; Joseph J. Pienta, Southbridge, both of Mass.

[73] Assignee: American Optical Corporation, Southbridge, Mass.

[21] Appl. No.: 746,178

[22] Filed: Jun. 18, 1985

[51] Int. Cl.⁴ .................. G02C 5/08; G02C 1/00; A61F 9/02
[52] U.S. Cl. .................... 351/63; 351/158; 351/41; 2/444
[58] Field of Search .............. 351/63, 60, 158, 41; 2/444

[56] References Cited

U.S. PATENT DOCUMENTS

| | | | |
|---|---|---|---|
| 1,171,750 | 6/1964 | Wulkow | 351/158 |
| 1,230,555 | 6/1917 | Brennecke | 351/63 |
| 2,905,172 | 9/1959 | Rodenstouse | 351/158 X |
| 4,542,965 | 9/1985 | Shedrow | 351/57 |

OTHER PUBLICATIONS

Ballistic Eye Protection, 11/16/78; drawings 000.1 and 000.2, "The Industrial Smok Spec Safety Spectacle." Scuba Spec, Inc.

Primary Examiner—Rodney B. Bovernick
Attorney, Agent, or Firm—Lorusso & Loud

[57] ABSTRACT

An optical lens carrying support structure for use with a protective face mask, comprising a pair of lens frames, each frame comprising an eyewire and a hinge portion, the lens frames being connected by a hinged nosepiece. The support structure attaches to the face mask by a slideably releasable dove-tail connection to a trapezoidal back-block, which back-block rigidly attaches to the face mask, with two opposite faces of the trapezoidal back-block inclined with respect to each other so as to establish the proper pantoscopic angle. The face-form angle is accomplished by virtue of an angled relation of the eyewire to the hinge portion of the lens frame. The lens frames fold back toward each other, facilitating removal of the lenses and folding the face mask assembly flat.

10 Claims, 6 Drawing Figures

SUPPORT STRUCTURE FOR PROTECTIVE MASK OPTICAL INSERT

BACKGROUND OF THE INVENTION

This invention relates generally to structures supporting optically correct prescription lenses for those who must wear protective masks, and more particularly to a support structure designed to be used with foldable protective masks and to accurately locate and facilitate replacement of prescription or otherwise specialized lenses. This invention may be used by those requiring vision correction and also having to wear protective masks, such as gas masks, full face respirators or welding helmets, scuba goggles, ski goggles, luge helmets and surgical masks, where ordinary spectacles with temples are impractical.

Persons requiring prescription lenses, and using protective face masks must be able to use the presecription lenses at the same time as the face mask. Often, these masks are used in hazardous environments, where it is difficult to see and necessary to be constantly aware of environmental conditions, and the location of emergency exits. Thus, proper adjustment of the prescriptive lenses is crucial.

It is also beneficial to permit changing the lenses for several reasons, as, for instance the persons's prescription changes. Further, in some specialized operations, different colored lenses, or lenses of different composition are required. Thus, easy exchange of the lenses is desired. In the past, several systems have been used to mount prescription or specialized lenses in protective masks. Each of these systems, discussed below, has particular drawbacks.

One method which has been used in the past, secures the lenses in metal frames which are joined by a spring-action nose bridge. A loop of wire or metal is attached to each frame at the location where normally a temple hinge would be found. These loops extend forward of the lenses and toward the center. The protective mask has a bracket near the center of the top of the face plate designed to receive the ends of the loops. Thus, the spectacles are suspended from the inside surface of the mask, by the metal loops. The loops are approximately one and one half times the diameter of each lens.

This metal retaining ring method has several disadvantages. Prescription lenses must be located properly to insure that the lenses will provide the optimum corrective benefit. Several terms must be defined to describe proper fitting of prescription lenses. The "eyewire" is that part of the frame that encircles and retains an individual lens. The "vertex position" is the vertical position of the lens centers with respect to the pupils. The "pantoscopic angle" is the angle by which the vertical axis of the lens is inclined to a nominal vertical reference with respect to the wearer's face. The "face-form" angle is an angle between two planes. The two planes that defined the face-form angle are the respective planes in which the perimeters of the eyewires lie. With the metal retaining ring structure, the lenses cannot be located accurately in front of the eye to afford optimum visual correction. It is also difficult to maintain the proper pantoscopic angle because of the inherent flexibility of the structure. Thus optimum visual correction is not provided. Similarly, proper face-form angle cannot be maintained due to the spring nosepiece. Vertical adjustment of the lenses is difficult. If the retaining rings are removed from the mask, it is difficult to reposition the lens carrier in the proper vertical position. Finally, lenses cannot be removed from the frame without using special tools, and without removing the lens carrier from the protective mask.

According to a second known method, a lens carrier support anchor is cemented to the inside surface of the face plate, or to the structure which supports the face plate. The anchor piece is designed to receive a semiflexible tab-like member which is integral with the nose bridge of a spectacle frame. The frame has no temples. Disadvantages of this system are that the relatively flexible tab does not secure the spectacle frames in a secure position, so that the pantoscopic angle can not be fixed. Further, the face-form angle is not easily customizable. Further, it is not possible to fix the vertical adjustment, or the horizontal distance from the pupils to the lenses. Finally, a face mask that may be folded flat when not in use, may not be folded flat when this type of a lens carrier is used.

In another variation, rather than cementing the support anchor to the face plate, the support anchor attaches to the face plate with a suction cup. In addition to the drawbacks mentioned above, this device may be used only for brief periods of time, and is not recommended for dangerous situations because the suction cup may disengage at any time.

Thus, the several objects of our invention include providing a support structure for protective face mask optcial inserts by which: accurate, stable positioning of the optical insert may be obtained; the optical insert may be removed from one mask and easily positioned and attached to another mask; proper pantoscopic and face-form angles may be achieved; proper vertical placement and pupil to lens distances may be achieved; the lenses may be easily removed and replaced without removing the support structure from the mask; the mask and lens support structure may be folded flat while not in use and safe, reliable positioning of the optical inserts may be accomplished.

SUMMARY OF THE INVENTION

This invention comprises a lens support that attaches to the inside of the face plate of a protective mask. It may be used with either single plate face masks, or face masks that may be folded flat, having two face plates. Briefly, the invention comprises a pair of lens frames joined by a hinge that makes up the nose bridge. Each individual lens frame is made up of an eyewire integrally formed with an element that makes up part of the hinged nose bridge. The hinge permits folding the pair of lens frames together so that the portions of the lense frames furthest away from the nose bridge almost touch. The hinged pair of lens frames attaches to a hinge block having a dove-tail type projection on the side facing away from the lens frames. The projection engages a back block provided with a suitably sized dove-tail groove. The back block attaches to an anchor that attaches to the face plate or to the mask adjacent the face plate. Thus, the presciption lenses are rigidly secured to the face mask through the dove-tails of the front hinge block and the back block.

The face of the back block that attaches to the anchor, and the opposite face of the back block, that engages the dove tail hinge block, are angularly disposed with respect to each other to provide the pantoscopic angle required by the particular wearer and mask. The cooperation of the front hinge block and the front surface of the hinge element of each lens frame may be customized to limit the hinged travel of the pair of lens frames, thereby adapting properly to the wearer's required face-form angle.

Due to the hinged attached between the two lens frames, the lens support may be folded flat when used with a protective mask which may be folded flat during non-use. Further, the lens supporting frames may be folded inward, and the lenses may be removed by popping them out from the rear. A lens and lens frame system, which permits snapping a lens into the lens frame from the front with only finger pressure, and also removing the lens by simply snaping the lens out, is described in the Assignee's co-pending co-assigned U.S. application Ser. No. 742,884, filed on June 10, 1985, in the name of Clark Grendol.

BRIEF DESCRIPTION OF THE FIGURES OF THE DRAWING

In the above described drawing, like elements are referred to by like reference numerals.

DETAILED DESCRIPTION OF THE PREFERRED EMBODIMENT

Figure 1:
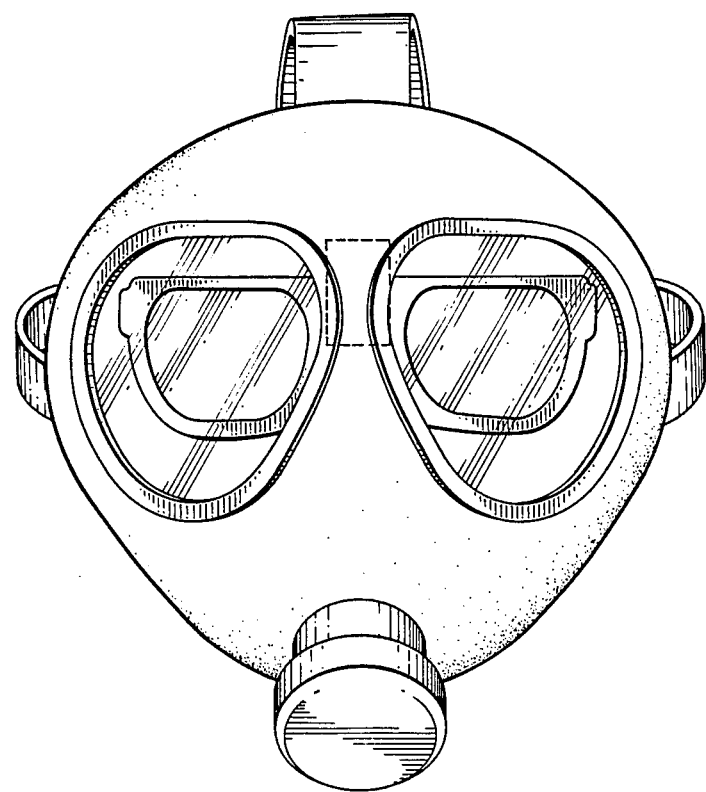
FIG. 1 shows schematically prescription or specialized lenses used in conjunction with a protective face mask.
Figure 6:
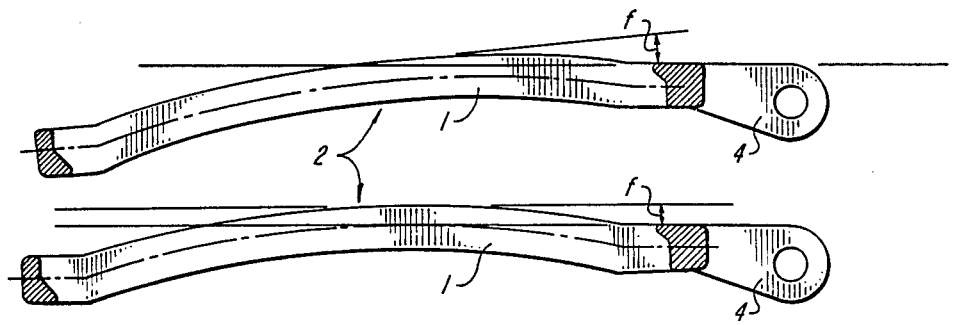
FIG. 6 is a plan view of two different left lens frames, each adapted to assemble into frame providing a different face-form angle.

Our invention may be more easily understood with reference to the Drawing identified above and the discussion below.

FIG. 1 shows schematically a person wearing a protective face mask, and also using prescription or special lenses carried by a lens support. It can be seen, that once the mask is in place, adjustment of the lens support is impossible. Therefore the lens support must be secured so that the position relative to the user's eyes is reproduceable. Further, it can be seen that standard eye glasses with temples are impractical and uncomfortable, due to the wrap-around features of the protective mask.

Figure 2:
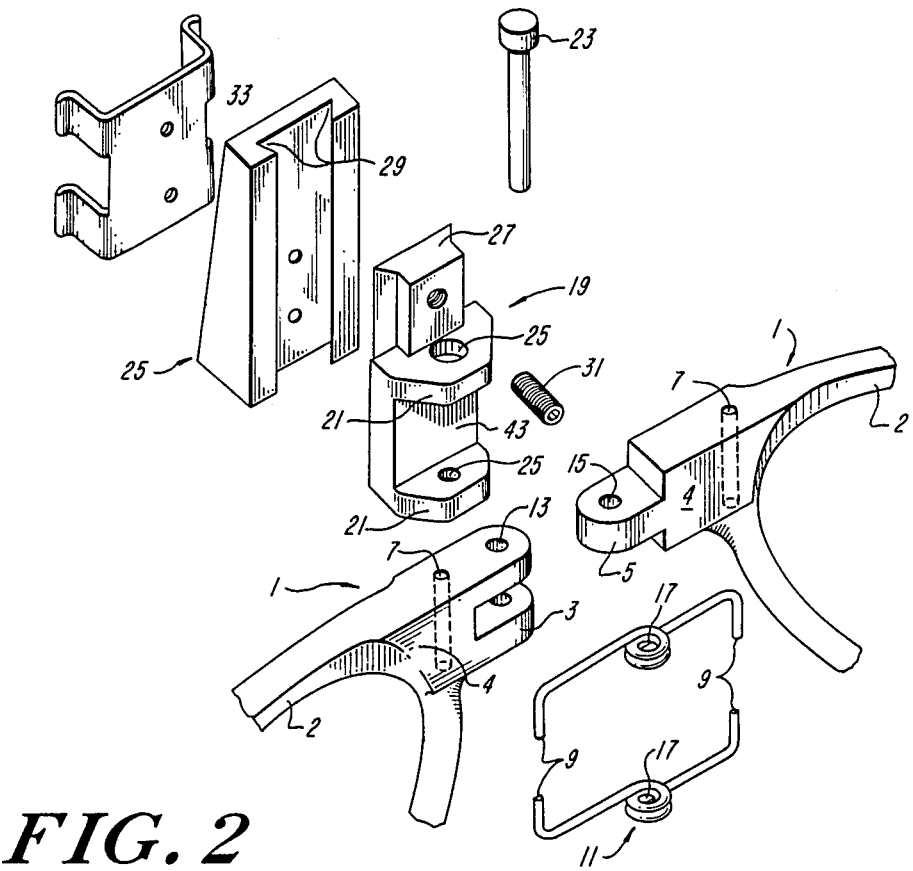
FIG. 2 shows an exploded isometric view of the components of our invention.
Figure 3:
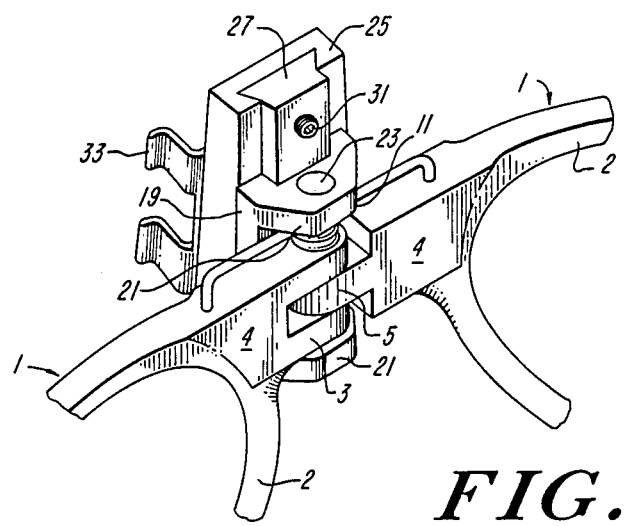
FIG. 3 shows an isometric view of the components illustrated in FIG. 2, assembled.

Our invention is understood most readily from reference to FIG. 2. FIG. 2 shows an exploded view of the elements of a preferred embodiment of our invention. Elements 1 are a pair of lens carrying frames, each frame made up of an eyewire 2 and a hinge portion 4. The eyewires are of a type designed to releasably engage lenses merely by snapping the lenses into place from the front. The eyewires are provided with a series of tabs (not shown) around the forward aperture of the eyewire, which engage the lens when the lens is snapped into place. This type of eyewire and lens system is described more fully in co-pending, commonly assigned application Ser. No. 742,884, filed on June 10, 1985, in the name of Clark Grendol. The frame portions 1 are provided with mating hinge lobes 3 and 5. Further, each lens frame is provided with a hole 7 designed to receive the arms 9 of a pair of torsion springs 11. The two lens frames are fit together with hinge lobe 5 sliding between hinge lobes 3. The torsion springs 11 are fitted into holes 7 on the top and bottom of the frames. When so joined, the spaces 17 formed by the looped torsion springs align with holes 13 and 15 in the hinge lobes 3 and 5 respectively.

Front hinge block 19 secures the torsion springs and the lens frames between upper and lower hinge block lobes 21 like a sandwich. Hinge pin 23 passes through holes 25 in hinge block lobes 21 and through spaces 17 in torsion springs 11 and holes 13 and 15 in hinge lobes 3 and 5. The hinge pin 23 may be secured by threading into the lower hinge block lobe 21, by plastic heat fusion methods, by a threaded nut (not shown) or by any well known means.

The vertex position of the lens frames is established by placing the front hinge block 27 in the proper vertical position with respect to the backblock 25. As described below, the back block is rigidly fixed with respect to the mask. The front hinge block is provided with a dove-tail projection 27, which slideably engages the dove-tail recess 29 in back block 25. Set screw 31 secures the hinge block in the proper vertical location.

Figure 4:
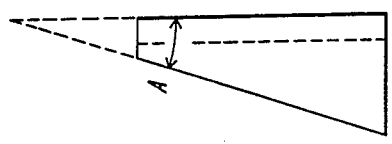
FIG. 4 shows an elevation side view of the back block, shown in FIG. 2.
Figure 5:
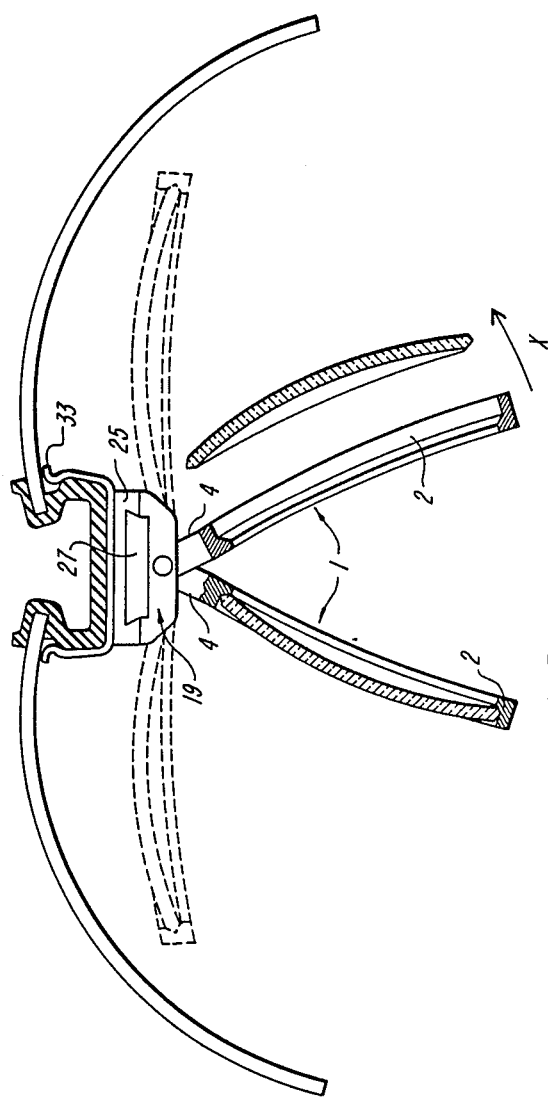
FIG. 5 shows a plan view of our invention, with both lens frames folded back and one lens removed, in partial cross-section.

Before the lens carrying structure described above is fixed with set screw 31 to back block 25, the back block and anchor piece 33 are attached to the protective mask. This may be accomplished by several means. In the case of a protective mask having left and right face plates, and a structural element located between the face plates in the general vicinity of the nose-piece, as illustrated in FIG. 5, the anchor 33 may be permanently attached to the structural element by any suitable means, including adhesives, heat sealing, or mechanical means. The back block 25 is permanently attached to the anchor piece 33. As can be seen from FIGS. 2 and 4, the back block is made up of a solid having a trapezoidal cross-sectional, with a dove-tail groove along one of the longer faces. As can be seen in FIG. 4, the forward face 35 (facing the anchor) is inclined with respect to the rearward face 37 (facing the hinge block). Changing this angle A permits customizing the pantoscopic angle. The pantoscopic angle must be customized for each particular user, and further, if the user uses different protective masks having different structures, it may be necessry to realign the placement of the lens carrying support structure with respect to the mask and the portions of the support structure that anchor the lens carrier to the mask. Therefore, several different back blocks may be used by each user.

The manner in which our invention accomodates the face-form angle may best be seen with reference to FIGS. 2, 3, 5 and 6. The face-form angle has been defined as the angle between the two planes each defined by the perimeter of the eyewires. From FIG. 6, it can be seen that each lens frame is made up of a hinge portion 4 adjacent the hinge lobes, and an eyewire 1 which generally surrounds the lens. When the frames are in the fully open position, shown in phantom in FIG. 5, the hinge portion 4 contacts the face plane 43 of the front hinge block. An eyewire angle f is defined by the intersection of the front surface of the hinge portion 4 and the forward plane of the eyewire 1. Thus, the eyewire is inclined at eyewire angle f with respect to the face plane 43. This eyewire angle f defines the face-form angle. Thus, the proper face-form angle may be obtained by properly preparing the eyewire angle f. This angle is either molded into the frames during fabrication, or, alternatively, it may be applied by heating and bending the frame during initial fitting of the frames.

For various reasons, it may from time to time be necessary or appropriate to exchange lenses in the support structure. In all of the known devices, replacement of lenses requires removing the support carrier from the face mask, and in some cases, using special tools to remove the lenses from the support carrier frames. Our invention is designed to be used with the special lens and eyewire system described fully in co-assigned co-pending patent application Ser. No. 742,884, in the name of Clark Grendol. According to that disclosure, a lens and frame combination is provided where small tabs around the forward aperture of the inside ring of the lens-holding frame secure the lens in the frame, once the lens has been snapped in place. The lens may be easily removed and replaced simply by hand. Thus, in the case of our invention, as illustrated by FIG. 5, a user desiring to exchange lenses, either to obtain a different prescription, or to obtain different lens characteristics, such as color, polarization, or composition simply folds the lens frame away from the face plate of the mask, and snaps the lens out from the lens frame pushing from the rear to the front (in the direction of the arrow X). The user inserts a replacement lens from the front of the rear and unfolds the lens frames back to the original position. This feature is also advantageous if the protective face mask becomes damaged, and the user needs to remove the lenses to another face mask and lens carrier combination. Again, the lenses may be removed, and snapped into place in another mask. This feature reduces the cost of outfitting a user with a wide variety of masks, as the cost of manufacturing the prescription lenses must only be borne once.

Thus, several schemes may be used for an operator using different masks or different types of masks. First, several different masks may be outfitted with the lens carrier support structure, but without any lenses. In that case, the user supplies the lenses, and exchanges them from mask to mask. This assumes that the lens carrier structure has been installed in such a way that when the lenses are inserted, the pantoscopic, face-form and other measurements will be proper. According to another scheme, rather than outfitting each mask with a lens carrier frame, each mask need only be outfitted with the anchor 33 and a back block 25, with an appropriately designed angle. Then, the lens carrying frame structure, including the frames 1 and the hinge block 21, may be removed from a particular mask, and placed into another type of mask by engaging the dove-tail projection. In this case, a minor adjustment must be made to insure proper vertical placement.

It can be seen from the FIG. 5, that in the case of protective face masks having a flexible front plate, or individual left and right lenses, the entire protective mask and lens support structure may be folded flat during periods of non-use.

The advantages of our invention are readily apparent. By virtue of the angled back block, the pantoscopic angle may be precisely adapted for the individual wearer and mask combination. Once installed in the face mask, this angle will not be altered by the user. Similarly, by virtue of the relatively inclined lens frame eyewires and hinge elements, the face-form angle is also precisely adaptable for the particular wearer. Also, the vertical adjustability feature allows for the vertex dimension to be set and maintained. These features are not available in any of the known art. The hinged arrangement of the two lens frames permits easy removal and replacement of lenses, facilitated by using frames provided with special tabs described in the co-assigned patent application identified above. Finally, the hinged arrangement permits using our lens inset in protective face masks which are folded flat when not in use.

The embodiment of the invention shown in FIG. 5 contemplates a permanent fixture of anchor 33 to the structural area between the left and right face plates of the face mask. The invention may also be practiced with a single face plate type mask. In that case, the anchor 33 would either be attached to the face plate with adhesive, or attached to a structural portion of the mask immediately adjacent the central upper edge of the face plate.

The foregoing description is meant to be illustrative only and should not be considered limiting in any sense. Practitioners ordinarily skilled in the art of protective mask or eye glass design will readily understand that the invention is not limited by the particular configuration of the hinge design, or the dove-tail type connection. Any slidable, fixable type of connection will provide the same advantages outlined above. Further, the invention is not limited to prescription lenses. Our invention may be used in any case where special lenses may be needed. Included in these lenses are colored lenses, lenses with special polarizing or magnifying properties, or lenses made of special materials.

Having thus described our invention, we claim:

1. Apparatus for supporting a protective mask optical insert to be used by a person wearing a protective face mask of the type having left and right face plates and a structural member between said face plates, said support apparatus comprising:
   (a) a hinged frame assembly, including:
      a pair of ring-shaped frames, each adapted to hold a single optical lens, each frame including:
         an eyewire; and
         a hinge portion;
      said frames being hingedly connected to each other by means of a spring loaded hinge that allows said frames to swing toward each other;
      each eyewire defining a plane in which the perimeter of said eyewire lies;
      means for maintaining a specified face-form angle defined by the intersection of the two said planes defined by each of the eyewires;
   (b) means for anchoring the hinged frame assembly to the protective mask;
   (c) means for permanently setting the pantoscopic angle between the user's face and the hinged frame assembly including a block having a trapezoidal cross-section, said trapezoidal block, having two pairs of parallel faces and a pair of faces inclined to each other, arranged so that a first face of the inclined pair is attachable to said anchoring means, and the second face of the inclined pair is attachable to the hinged frame assembly; and
   (d) slidably releasable means for attaching the hinged frame assembly to the means for setting the pantoscopic angle.

2. The apparatus of claim 1 wherein the slidably releasable means for attaching the hinged frame assembly to the means for setting the pantoscopic angle comprises a dove-tail shaped groove provided in the face of the trapezoidal block that is attachable to said hinged frame assembly and a cooperating dove-tail shaped projection, attached to a hinge block element of the hinged frame assembly, said dove-tail groove and projection being designed so as to slideably releasably mate with each other.

3. The apparatus of claim 2 wherein:

said hinge portions of said ring-shaped frames each have a front surface;

said hinge block element has a planar face plane surface;

said spring-loaded hinge urges said frames to fold together in the direction away from the wearer, bringing said hinge portions into contact with said face plane;

for each eyewire, a plane is defined by a pair of intersecting eyewire diameters;

an eyewire angle is defined by the intersection of the plane parallel to the front surface of each said hinge element and the corresponding eyewire plane;

said means for maintaining a specified face-form angle comprises:

said hinge element and eyewire inclined with respect to each other to define said eyewire angle; and said spring-loaded hinge urging said frames to fold away from the wear to contact with said faceplane.

4. The apparatus of claim 1 wherein said eyewires of said hinged frame assembly have a forward aperture and rearward aperture and may be folded toward each other in the rearward direction to a degree sufficient to permit removal of said lenses from the forward aperture.

5. The apparatus of claim 1 wherein said eyewires of said hinged frame assembly may be folded toward each other in the direction of the wearer to a degree sufficient to permit folding said protective mask substantially flat during non-use.

6. The apparatus of claim 5 wherein said means for anchoring the hinged frame assembly to the protective mask attaches to said structural member of said mask, between said left and right face plates.

7. Apparatus for supporting a protective mask optical of the type having a single face plate adjacent by a plate retaining element of the mask, said support apparatus comprising:

(a) a hinged frame assembly, comprising:

a pair of ring-shaped frames, each adapted to hold a single optical lens, each frame comprising:

an eyewire; and a hinge portion;

said frames being hingedly connected to each other by means of a spring loaded hinge that allows said frames to swing toward each other;

each eyewire defining a plane parallel to a pair of intersecting eyewire diameters;

means for maintaining a specified face-form angle defined by the intersection of the two said planes defined by each of the eyewires;

(b) means for anchoring the hinged frame assembly to the protective mask;

(c) means for permanently setting the pantoscopic angle between the user's face and the hinged frame assembly including a block having a trapezoidal cross-section, said trapezoidal block, having two pairs of parallel faces and a pair of faces inclined to each other, arranged so that a first face of the inclined pair is attachable to said anchoring means, and the second face of the inclined pair is attachable to the hinged frame assembly; and (d) slidably releasable means for attaching the hinged frame assembly to the means of setting the pantoscopic angle.

8. The apparatus of claim 7 wherein said means for anchoring the hinged frame assembly to the protective maks attaches to said face plate retaining element of the mask above and adjacent the horizontal midpoint of the face plate.

9. Apparatus for supporting a protective mask optical insert to be used by a person wearing a protective face mask of the type having left and right face plates and a structural member between said face plates, said support apparatus comprising:

(a) a frame assembly, including:

a pair of ring-shaped frames, each adapted to hold a single optical lens;

(b) means for anchoring the frame assembly to the protective mask;

(c) means for permanently setting the pantoscopic angle between the user's face and the frame assembly including a block having a trapezoidal cross-section, said trapezoidal block, having two pairs of parallel faces and a pair of faces inclined to each other, arranged so that a first face of the inclined pair is attachable to said anchoring means, and the second face of the inclined pair is attachable to the hinged frame assembly; and (d) slidably releasable means for attaching the frame assembly to the means for setting the pantoscopic angle.

10. The apparatus of claim 9 wherein the slideably releasable means for attaching the frame assembly to the means for setting the pantoscopic angle comprises a dove-tail shaped groove provided in the face of the trapezoidal block that is attachable to said frame assembly and a cooperating dove-tail shaped projection, attached to a hinge block element of the frame assembly, said dove-tail groove and projection being designed so as to slideably releasably mate with each other.

* * * * *